United States Patent [19]
Haas et al.

[11] Patent Number: 5,735,497
[45] Date of Patent: Apr. 7, 1998

[54] SELF-LEVELING MOUNT OR PLATFORM FOR A RAPID DEPLOYMENT SYSTEM

[75] Inventors: Edwin G. Haas, Sayville; Edward V. Sullivan, Huntington Station, both of N.Y.

[73] Assignee: Northrop Grumman Corporation, Los Angeles, Calif.

[21] Appl. No.: 578,361

[22] Filed: Dec. 26, 1995

[51] Int. Cl.$^6$ ............................................. F16M 11/14
[52] U.S. Cl. ...................................... 248/181.1; 248/168
[58] Field of Search ............................. 248/181.1, 181.2, 248/183.3, 168, 167, 430

[56] References Cited

U.S. PATENT DOCUMENTS

| | | | |
|---|---|---|---|
| 2,613,901 | 10/1952 | Tatar | 248/167 |
| 3,445,082 | 5/1969 | Proctor et al. | 298/183.3 |
| 3,795,378 | 3/1974 | Clarke | 248/168 |
| 4,697,772 | 10/1987 | Kosugi et al. | 298/183.3 |
| 5,551,655 | 9/1996 | Berger | 298/168 |

*Primary Examiner*—Ramon O. Ramirez
*Assistant Examiner*—Willie Berry, Jr.
*Attorney, Agent, or Firm*—Terry J. Anderson; Karl J. Hoch, Jr.

[57] ABSTRACT

A self-leveling mount or platform, particularly for optical and surveillance equipment in rapid deployment systems which can be set up quickly and easily. The mount preferably employs a normally-on brake which is released by actuation of a solenoid. An assembly of equipment, which includes the self-leveling mount or platform, is mounted by a support tube on a spherical bearing, with the center of gravity of the assembly being positioned a given distance below the center of the spherical bearing. When the brake is momentarily released, gravity forces the center of gravity of the assembly to assume the lowest possible position relative to the center of the spherical bearing, which aligns the attached mount or platform horizontally. This self-leveling feature can be activated locally or remotely, and prevents image tilt when optical surveillance instruments are mounted on the platform, and are used to pan (rotate) about the platform's vertical axis. In military applications, the present invention offers the potential for self-deployment, and the ability to rapidly place surveillance equipment so that personnel can effectively "set and forget" field-based equipment. The instrument mounting platform is supported vertically above the spherical bearing by the mounting arm, such that the platform is supported in an elevated position to allow surveillance instruments mounted thereon to have an elevated unobstructed view of the surrounding terrain.

15 Claims, 4 Drawing Sheets

SELF-LEVELING MOUNT OR PLATFORM FOR A RAPID DEPLOYMENT SYSTEM

BACKGROUND OF THE INVENTION

1. Field of the Invention

The present invention relates generally to a self-leveling mount or platform. More particularly, the subject invention pertains to a self-leveling mount or platform for optical and surveillance equipment in a rapid deployment system.

2. Discussion of the Prior Art

Optical systems used in surveillance such as television or video cameras, scanners, infrared sensors, etc. often depend upon a stable base mount for proper operation and functioning. This type of optical system mount can require much time and care to set up, level and adjust. The leveling can be particularly important when the optical device or system includes digital equipment which must pan or pan and tilt. The self-leveling mount of the present invention offers a low cost, all weather, universal optical mount which can be used for many different types of optical and surveillance equipment.

In military applications, the self-leveling mount of the present invention minimizes potential risks when setting up instruments and surveillance equipment in hostile areas. Additionally, the self-leveling mount offers the potential to level a platform remotely from a remote control device. For military applications, this potential provides a capability of self-deployment.

In applications with scanning optical instruments, the present invention allows continuous 360° tracking without rotation of the transmitted image, which can be caused by a nonvertical axis of rotation of the scanning optical instrument. If the axis of rotation of a scanning optical instrument is not vertical (perpendicular to the plane of the horizon), a sensing system is frequently used to provide angular data for real time software image transformation. The self-leveling mount of the subject invention eliminates the need for such a sensing system, and is a simple, reliable, lightweight, low cost alternative to existing currently available optical mounts.

SUMMARY OF THE INVENTION

Accordingly, it is a primary object of the present invention to provide a self-leveling mount or platform, particularly for optical and surveillance equipment in rapid deployment systems.

A further object of the subject invention is the provision of a lightweight, self-leveling mount or platform for mechanical, electrical and/or electro-optical systems which can be set up quickly and easily. The mount preferably employs a normally-on brake which is released by actuation of a solenoid. An assembly of equipment, which includes the self-leveling mount or platform, is mounted by a support tube on a spherical bearing, with the center of gravity of the assembly being positioned a given distance below the center of the spherical bearing. When the brake is momentarily released, gravity forces the center of gravity of the assembly to assume the lowest possible position relative to the center of the spherical bearing, which aligns the attached mount or platform horizontally. This self-leveling feature can be activated locally or remotely, and prevents image tilt when optical surveillance instruments are mounted on the platform, and are used to pan (rotate) about the platform's vertical axis. In military applications, the present invention offers the potential for self-deployment, and the ability to rapidly place surveillance equipment so that personnel can effectively "set and forget" field-based equipment.

In accordance with the teachings herein, the present invention provides a self-leveling instrument mounting platform which is designed to be horizontally supported by a spherical bearing. A housing for heavy electronic equipment such as batteries is supported on a mounting arm a given distance below the spherical bearing. The arrangement is such that when the center of gravity of the equipment supported by the spherical bearing is positioned vertically below the center of the spherical bearing, the instrument mounting platform is supported in a horizontal position.

In greater detail, an exterior support frame centrally mounts a split outer bearing race, in which the spherical bearing rotates. The exterior support frame includes a plurality of support legs attached thereto, preferably in a tripod arrangement, to support the support frame on an ambient terrain. Although a tripod support arrangement is illustrated in one embodiment, in alternative embodiments the self-leveling platform could be supported by other support structures such as a wall, building, etc. A spring biases the outer bearing race compressibly against the spherical bearing, and an electromechanical actuator, such as a solenoid, is actuated to release the outer bearing race from the spherical bearing to allow the center of gravity of the supported assembly to position itself vertically below the spherical bearing. The split outer bearing race is mounted within a collar which includes two parallel extension arms. The solenoid actuator shaft is mounted across the two parallel extension arms, and the spring biases the two parallel extension arms together to compress the split outer bearing race against the spherical bearing. The solenoid is actuated to release the two parallel extension arms noncompressibly away from the spherical bearing, such that when the solenoid is actuated, the center of gravity of the supported structure will position itself vertically below the spherical bearing which also results in the self-leveling platform assuming a horizontal position.

The instrument mounting platform is supported vertically above the spherical bearing by the mounting arm, such that the platform is supported in an elevated position to allow surveillance instruments mounted thereon to have an elevated unobstructed view of the surrounding terrain. In a preferred embodiment, the instrument mounting platform mounts thereon a scanning camera and an infrared detector, and a panning mechanism is provided for panning of the instruments. A protective bellows boot is positioned around the spherical bearing to protect it from adverse affects of the environment, and preferably includes first and second protective bellows boots positioned respectively above and below the exterior support frame around the spherical bearing.

BRIEF DESCRIPTION OF THE DRAWINGS

The foregoing objects and advantages of the present invention for a self-leveling mount or platform for rapid deployment systems may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
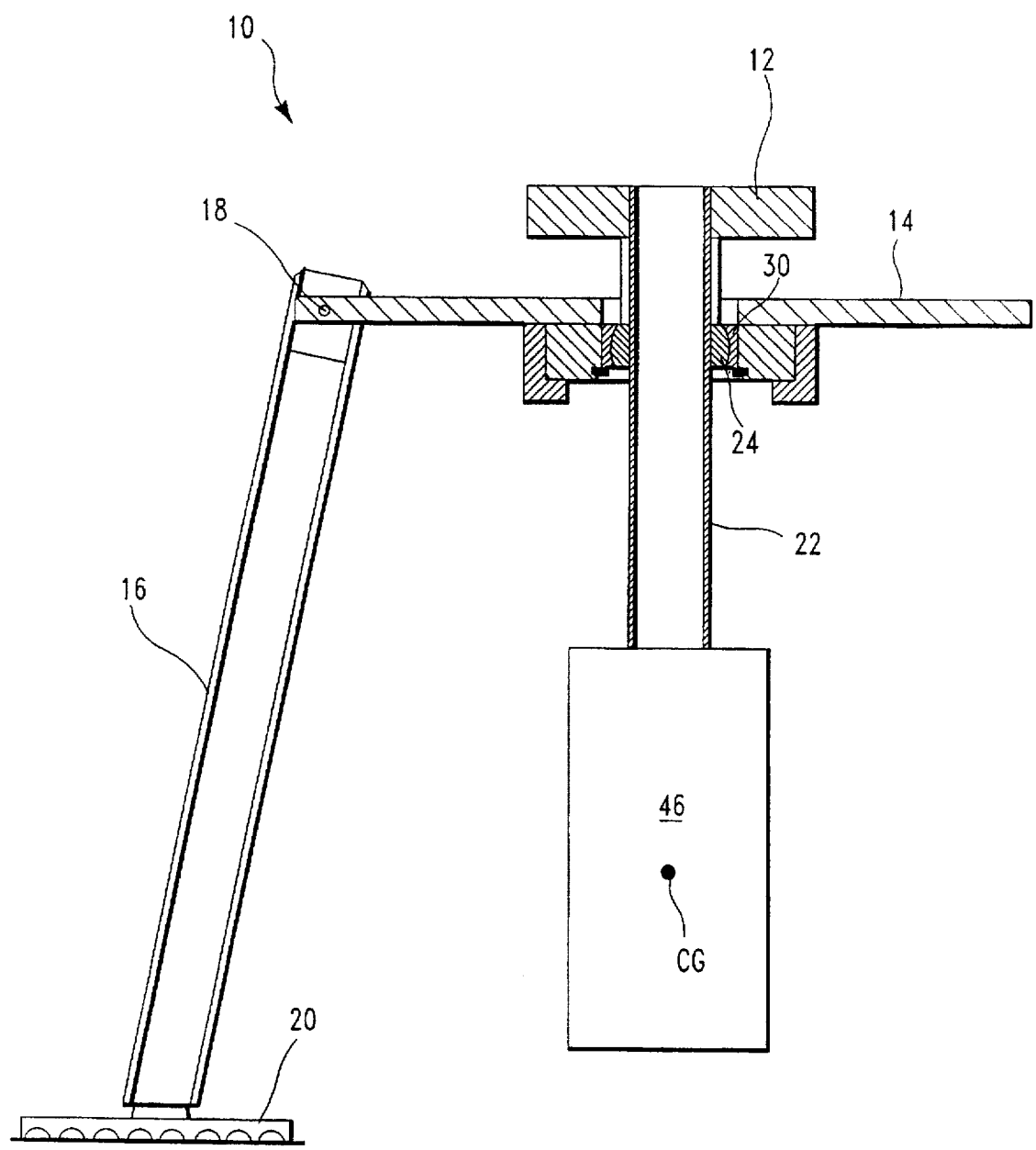
FIG. 1 is a partial sectional view of one embodiment of a remote surveillance station having a self-leveling platform for a rapid deployment system pursuant to the teachings of the present invention.
Figure 2:
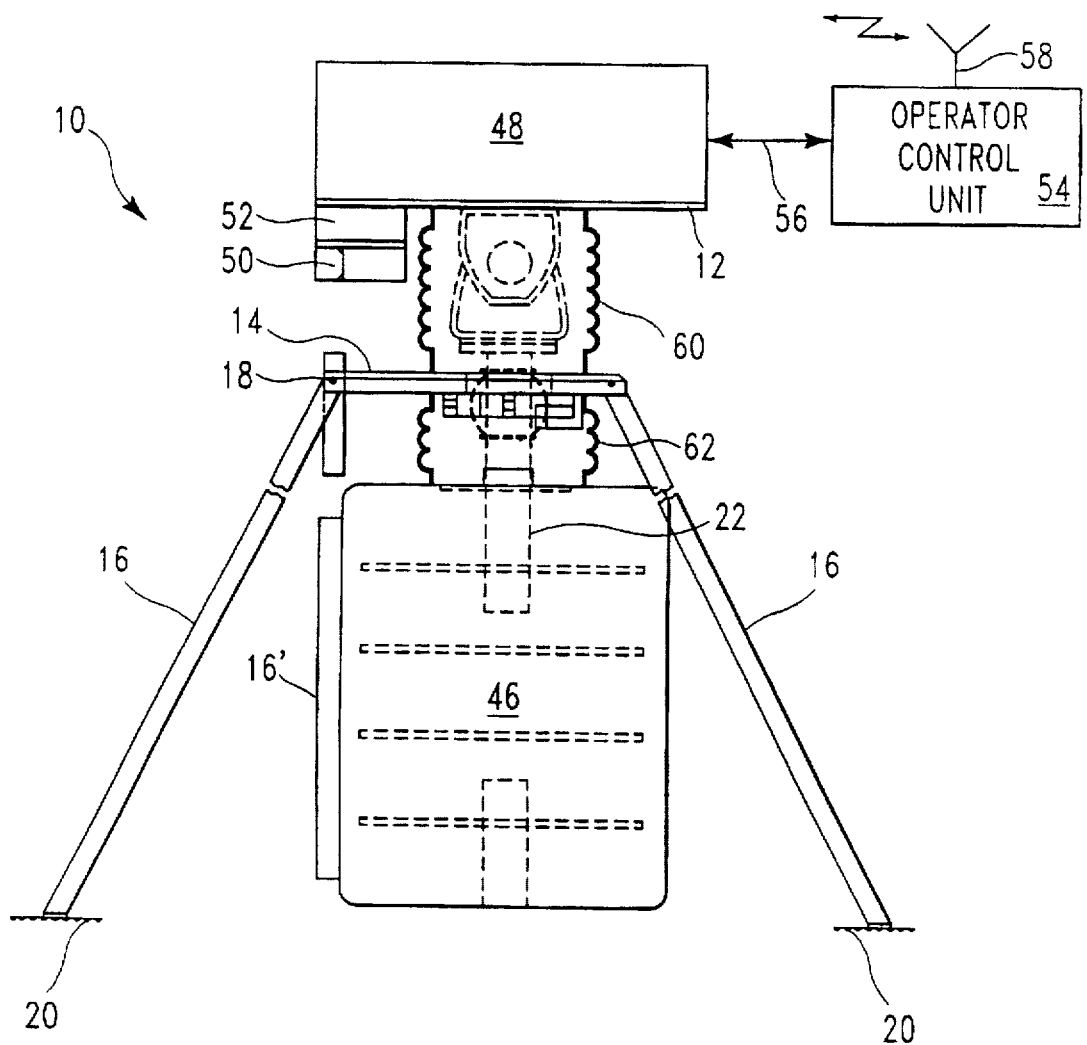
FIG. 2 is an elevational view of a conceptual remote station having a self-leveling platform for rapid deployment systems as shown in FIG. 1, illustrating in further detail several of the major components of the self-leveling platform.

Referring to the drawings in detail, FIG. 1 is a partial sectional view of one embodiment of a self-leveling platform 10 for a rapid deployment system pursuant to the teachings of the present invention. FIG. 2 is an elevational view of the self-leveling platform shown in FIG. 1 implemented in a remote station, and illustrates in further detail several of the major components thereof. The self-leveling platform 10 includes an instrument mounting platform 12 which is designed to be deployed horizontally. The arrangement includes a main support frame 14 which is supported by a tripod arrangement of three support legs 16, only one of which is illustrated in FIG. 1, which extend and lock, in a stable attitude relative to the main support frame 14. Each support leg 16 is mounted to the main support frame 14 by a support pin 18, and has a stop defining the correct attitude for a deployed position. A self-leveling swivel pad footing 20 with a large non-slip surface area is provided at the lower end of each support leg 16 to provide a stable mount and support on the terrain for each support leg 16. Each of the legs 16 is pivotally pinned at 18 to the support plate 14, 120 degrees apart, and can fold in, as illustrated by position 16' in FIG. 2, and be clipped or strapped during transport. This configuration can also be used for an air dropped deployment with appropriately chosen and mounted components.

Figure 3:
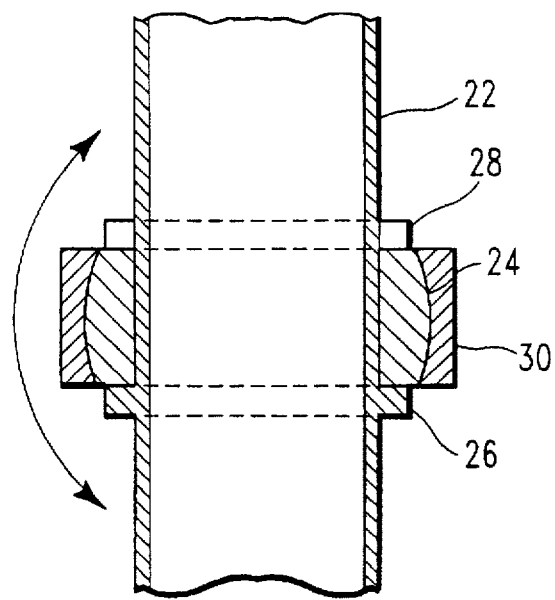
FIG. 3 is an elevational sectional view of an exemplary embodiment of a multi-axis universal linkage lock utilized to lock in position a self-leveling platform constructed pursuant to the teachings of the present invention.
Figure 4:
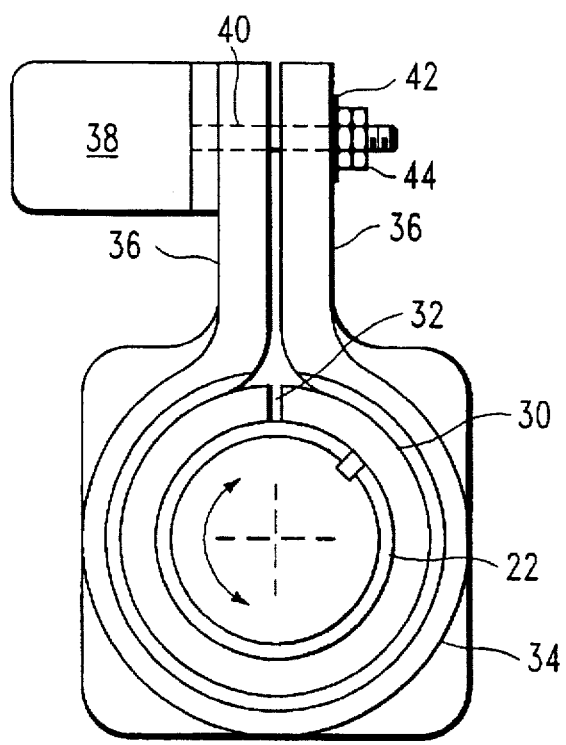
FIG. 4 illustrates a plan view of a multi-axis universal linkage lock similar to that illustrated in FIG. 3.
Figure 5:
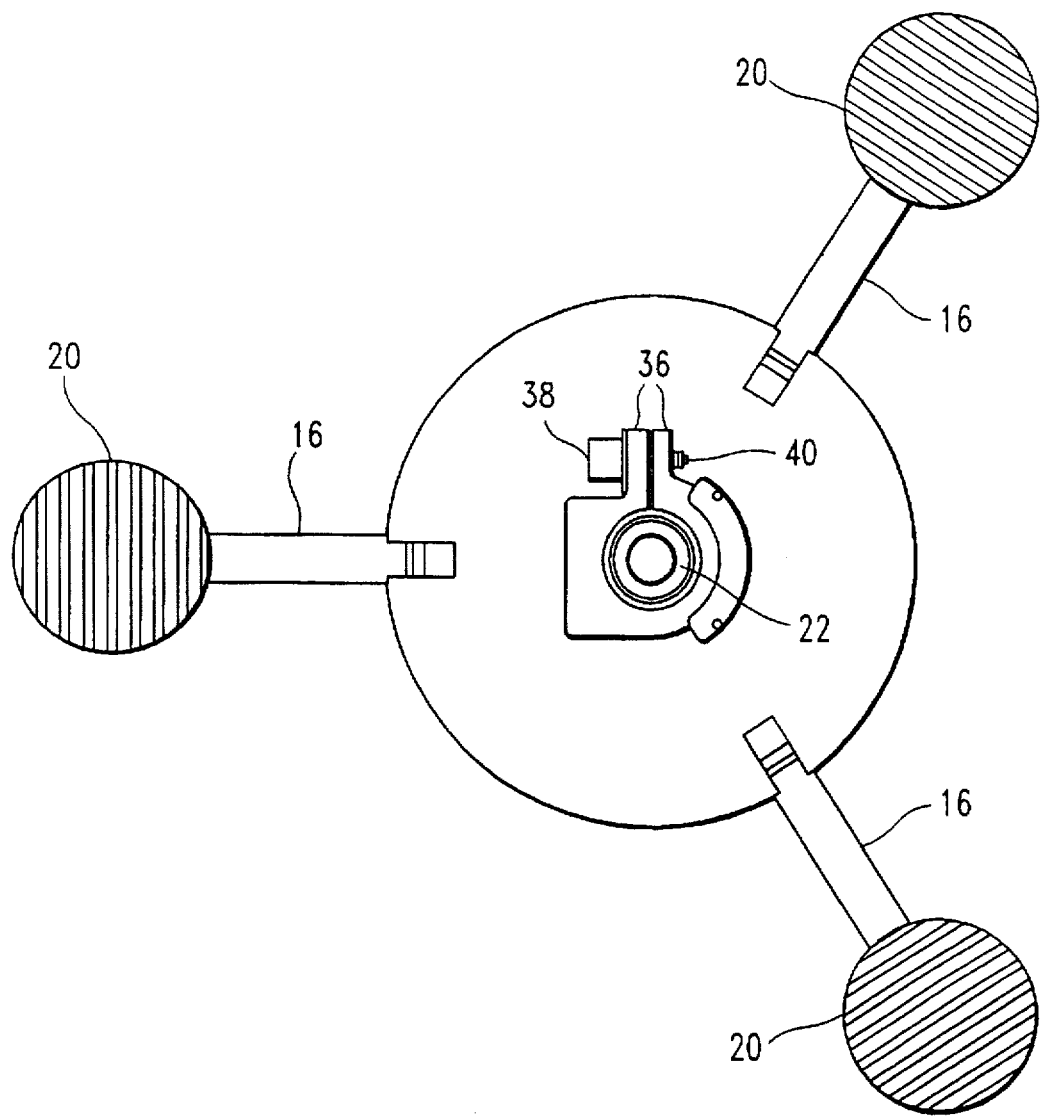
FIG. 5 is a bottom plan view of the self-leveling platform of FIGS. 1 and 2, illustrating details of the multi-axis universal linkage lock, as shown in FIGS. 3 and 4, of the self-leveling platform.

Depending upon the nature of the terrain, after deployment the self-leveling platform 12 may or may not be horizontally positioned. The instrument mounting platform 12 is supported by the main support frame 14 in a manner to provide that the instrument mounting platform 12 is self-leveling in a horizontal position. The instrument mounting platform 12 is mounted to the upper end of a central tubular support 22 which is supported by a spherical bearing 24 mount. As illustrated in FIG. 3, the spherical bearing 24 is mounted to the central support tube 22 between a flange 26 defined on the central support tube below the spherical bearing 24 and a retaining ring 28, such as a Truarc retainer, secured to the central support tube above the spherical bearing 24. The spherical bearing 24 is mounted in a split outer bearing race 30 having at least one slit 32 of a predetermined width formed therein. The outer bearing race 30 is in turn mounted in an outer collar 34 which includes two parallel, extension arms 36. The two parallel extension arms 36 extend to a solenoid actuator 38 having an actuator shaft 40 extending between the two parallel extension arms 36. A spring in the form of one or more Belleville washers 42 is mounted on the second end of the actuator shaft 40 and is held in compression thereon by nuts 44 on the second end of the actuator shaft 40.

The arrangement is such that when the solenoid 38 is not actuated, the spring Belleville washers 42 apply a compressive force between the two parallel extension arms 36 which in turn apply a compressive force on the split outer race 30 which locks the spherical bearing 24 in place in the split outer race. When the solenoid 38 is actuated, the solenoid actuator shaft 40 is extended relative to the solenoid allowing the two parallel extension arms 36 of the collar 34 to separate under the natural outward spring bias of the collar 34 to release the split outer race 30 from the spherical bearing 24, thereby allowing the spherical bearing 24 to rotate freely within the bearing race 30.

The arrangement provides a counterweight arrangement in which the center of gravity CG of all of the apparatus supported by the spherical bearing and the support tube is positioned a given distance below the spherical bearing. This is preferably accomplished by positioning the heaviest equipment, such as the batteries, in an enclosure housing 46 supported by the support tube 22 below the spherical bearing 24 mount. When the spherical bearing is released for rotation by actuation of the solenoid, the center of gravity seeks a position vertically below the spherical bearing, in which the equipment mounting platform is also horizontally mounted.

Individual electronic components and modules are arranged in the housing 46 so that their combined center of gravity acts as a vector directly through the center of the support tube 22. The housing can be aluminum or other material and should be shaped as required to provide a minimum size, lightweight, all-weather survivable enclosure.

The configuration of the support frame plate 14 can be round for balance and safer handling while at the same time supplying additional surface area for mechanical or electrical components that do not require balancing, orientation, or protection from the environment. In alternative embodiments, the support frame plate 14 can have a triangular configuration which reduces weight for a system that requires less electronics packaging and/or easy transport. Either embodiment provides a plurality, preferably three in a tripod arrangement, of pivot points 18 for a plurality of extension legs 16. Although a tripod support arrangement is illustrated in one embodiment, in alternative embodiments the self-leveling platform could be supported by other support structures such as a wall, building, etc.

The instrument mounting platform provides an elevated horizontal mounting surface 12 for any instruments and equipment that must remain horizontally level during operation, and preferably have an elevated and unobstructed view of its surroundings. The horizontal mounting surface 12 is provided for electro-optics sensors such as trackers, cameras, IR sensors, etc. which operate and optionally rotate with an elevated, unobstructed field of view of the surrounding terrain and environment.

The mounting structure is hollow so that wires can be run internally from the batteries below to the instruments mounted above, or if cooling is necessary, a fan could be added inside of the battery compartment which could pass cool air to the optical components attached to the mounting platform 12.

The tubular support member 22 may or may not pass through both sides of the mounting platform 12. This option is available if heat, such as generated by components in the enclosure 46, needs to be vented to the outside for cooling, or possibly contained at the upper level of platform 12 for heating purposes during low temperature conditions that might decrease equipment operating efficiency. The spherical bearing 24 could be barrel shaped and hollowed out in the center in these embodiments if additional weight savings are desirable.

The enclosure 46 preferably provides an environmentally sealed container for electrical and electronic equipment which might include batteries, power supply circuits, an RF transceiver, a global positioning system, a compass, and electronics such as a controller/processor, image processor, image digitizer, a pan/tilt controller, and power control circuits. The weight and geometric layout of this equipment provides a counterweight to bring platform 12 to a horizontally deployed position after solenoid 38 is momentarily actuated to release the spherical bearing 24 for rotational movement within the outer race 30. The electronic and optical instruments supported on mounting platform 12, and the equipment located within the electronics enclosure housing 46, are preferably arranged so as to locate the center of gravity (CG) of all of the components supported by the spherical bearing 24 mount as low as possible and also horizontally as close as practical to the center line of the tubular support member 22. The heavier components (e.g., the batteries) are placed vertically as low as possible within the electronics enclosure housing 46 to position the center of gravity CG of all of the components supported by the spherical bearing 24 mount as low vertically as practical to ensure that the self-alignment feature functions optimally.

The electromechanical solenoid actuator 38, when energized, allows the entire pivotal instrumentation package supported by spherical bearing 24 to "float" until platform 12 assumes a horizontal position. When the solenoid 38 is de-energized, a spring brake is applied thus locking the mechanism. The system remains locked until another leveling adjustment is required, as may be due to possible surface shifting. The self-leveling system can be actuated manually at the assembly location, or automatically at the assembly location by a sensor such as a timer, inclinometer, mercury switch, pressure transducer, etc., or remotely by a transmitted signal while also possibly using any of the above sensors. The braking system is usually in the normally-on (locked) position, thus not requiring any power drain. The MULTI-AXIS UNIVERSAL LINKAGE LOCK is described in detail in related patent application Ser. No. 08/578,766, filed Dec. 26, 1995, the disclosure of which is expressly incorporated by reference herein.

Accessibility to the interior components of the enclosure 46 is optional, and may typically be provided by a hinged or pinned sealed door or hatch. The three extension legs 16 regulate the height of the system, which is usually determined by the size of the power supply batteries and optional electronic equipment, and the ground clearance required for an unobstructed view of the surrounding environment and terrain by the sensors and cameras.

The self-leveling platform 10 preferably has minimal volume and weight, however, producibility and cost factors will influence the enclosure's design configuration.

In one embodiment, the sensors mounted on the platform 12 may include a bore-sighted forward looking infrared radar sensor (FLIR) 48, a low light level television camera (LLLTV) 50 and a laser range finder (LRF) 50 mounted on a pan-tilt mechanism. In this embodiment, a processor in the enclosure 46 controls the pan-tilt mechanism, analyzes sensor and radio signal information, transmits information to a distant operator control unit 54 which performs image processing required to detect and track targets in response to alarms. The image processor centers a target in the field-of-view, and compresses image data. Transmissions with the operator control unit can be by a direct wire connection 56 or by radio frequency transmission 58.

The spherical bearing mount can be protected from environmental adversities such as dirt, snow and ice by top and bottom rubber boots 60, 62. The all weather self-alignment capability ensures that the slew axis aligns vertically to the gravitational force vector. This approach result in less moving parts, less complexity for improved survivability, and inherently lower weight, power consumption and cost.

While several embodiments and variations of the present invention for a self-leveling platform for rapid deployment systems are described in detail herein, it should be apparent that the disclosure and teachings of the present invention will suggest many alternative designs to those skilled in the art.

What is claimed is:

1. A self-leveling platform comprising:
   a. a spherical bearing support;
   b. an instrument mounting platform which is designed to be horizontally supported by said spherical bearing; and
   c. a housing, mounted to the lower end of a support member which extends upwardly a given distance to and is supported by and below said spherical bearing support, for housing heavy electronic equipment, such as batteries, such that the center of gravity of the equipment supported by said spherical bearing is positioned vertically below the center of said spherical bearing when the instrument mounting platform is supported in a horizontal position.

2. A self-leveling platform as claimed in claim 1, wherein an exterior support frame mounts said spherical bearing.

3. A self-leveling platform as claimed in claim 2, wherein the exterior support frame centrally mounts a split outer bearing race for the spherical bearing, in which the spherical bearing rotates.

4. A self-leveling platform as claimed in claim 3, wherein a spring means biases the outer bearing race compressibly against the spherical bearing, and an electromechanical actuator actuates the outer bearing race to release the outer bearing race from the spherical bearing to allow the center of gravity to position itself vertically below the spherical bearing.

5. A self-leveling platform as claimed in claim 4, wherein said electromechanical actuator comprises a solenoid.

6. A self-leveling platform as claimed in claim 4, wherein said split outer bearing race is mounted within a collar which includes two parallel extension arms, and said electromechanical actuator comprises a solenoid with an actuator shaft mounted across the two parallel extension arms, and said spring means biases the two parallel extension arms together to compress the split outer bearing race against the spherical bearing, and said solenoid is actuated to release the two parallel extension arms noncompressibly away from the spherical bearing, such that when the linkage lock is released, the center of gravity of the structure will position itself vertically below the spherical bearing which also results in the self-leveling platform assuming a horizontal position.

7. A self-leveling platform as claimed in claim 2, wherein said exterior support frame includes a plurality of support legs attached thereto to support the support frame on an ambient terrain.

8. A self-leveling platform as claimed in claim 7, wherein said plurality of support legs comprise three support legs in a tripod arrangement.

9. A self-leveling platform as claimed in claim 2, wherein first and second protective bellows boots are positioned respectively above and below said exterior support frame around said spherical bearing.

10. A self-leveling platform as claimed in claim 1, wherein said instrument mounting platform is supported vertically above said spherical bearing by said mounting arm.

11. A self-leveling platform as claimed in claim 1, wherein said instrument mounting platform mounts thereon a scanning camera and an infrared detector, and a panning mechanism is provided for panning of the instruments.

12. A self-leveling platform as claimed in claim 1, wherein a protective bellows boot is positioned around said spherical bearing.

13. A self-leveling platform as claimed in claim 1, wherein a remote control unit is in radio communication with the self-leveling platform for remotely actuating the self-leveling platform.

14. A self-leveling platform as claimed in claim 1, supported by a supporting structure such as a building.

15. A self-leveling platform as claimed in claim 1, wherein a wire connection remotely actuates the self-leveling platform.

* * * * *